(12) United States Patent
Guest

(10) Patent No.: US 6,769,721 B2
(45) Date of Patent: Aug. 3, 2004

(54) MOLDED PLASTICS TUBULAR COUPLINGS

(75) Inventor: John Derek Guest, Maidenhead (GB)

(73) Assignee: John Quest International Limited (GB)

( * ) Notice: Subject to any disclaimer, the term of this patent is extended or adjusted under 35 U.S.C. 154(b) by 0 days.

(21) Appl. No.: 09/767,514

(22) Filed: Jan. 23, 2001

(65) Prior Publication Data

US 2001/0052699 A1 Dec. 20, 2001

(30) Foreign Application Priority Data

Jan. 24, 2000 (GB) ............................................. 0001547

(51) Int. Cl.⁷ ............................................. F16L 21/00

(52) U.S. Cl. ...................... 285/347; 285/239; 285/370; 285/397

(58) Field of Search ................................. 285/239, 240, 285/347, 370, 397, 260, 334.1, 334.3, 369, 257

(56) References Cited

U.S. PATENT DOCUMENTS

| | | | | |
|---|---|---|---|---|
| 2,485,976 A | * | 10/1949 | Main ........................... | 285/256 |
| 3,269,754 A | * | 8/1966 | Bertling et al. ......... | 285/397 X |
| 4,867,133 A | * | 9/1989 | Sadler ..................... | 285/370 X |
| 4,906,030 A | * | 3/1990 | Yokomatsu et al. ........ | 285/256 |
| 5,096,233 A | * | 3/1992 | Dlouhy ..................... | 285/334.3 |
| 5,851,036 A | * | 12/1998 | Vanesky ..................... | 285/369 |
| 5,961,157 A | * | 10/1999 | Baron et al. ................ | 285/256 |
| 6,126,206 A | * | 10/2000 | Topf, Jr. ................. | 285/397 X |
| 6,439,620 B1 | * | 8/2002 | Guest ......................... | 285/347 |

* cited by examiner

Primary Examiner—David Bochna
(74) Attorney, Agent, or Firm—Baker & Daniels

(57) ABSTRACT

A molded plastic tubular coupling including a plastic sleeve having an integral head at one end. The sleeve provides a cylindrical outer surface to engage in a corresponding bore of another component. The cylindrical outer surface has an encircling annular recess and an integral radially extending flexible annular diaphragm formed in the recess. The diaphragm has an outer periphery extending outwardly from the cylindrical surface to engage and grip the corresponding surface of another component.

10 Claims, 3 Drawing Sheets

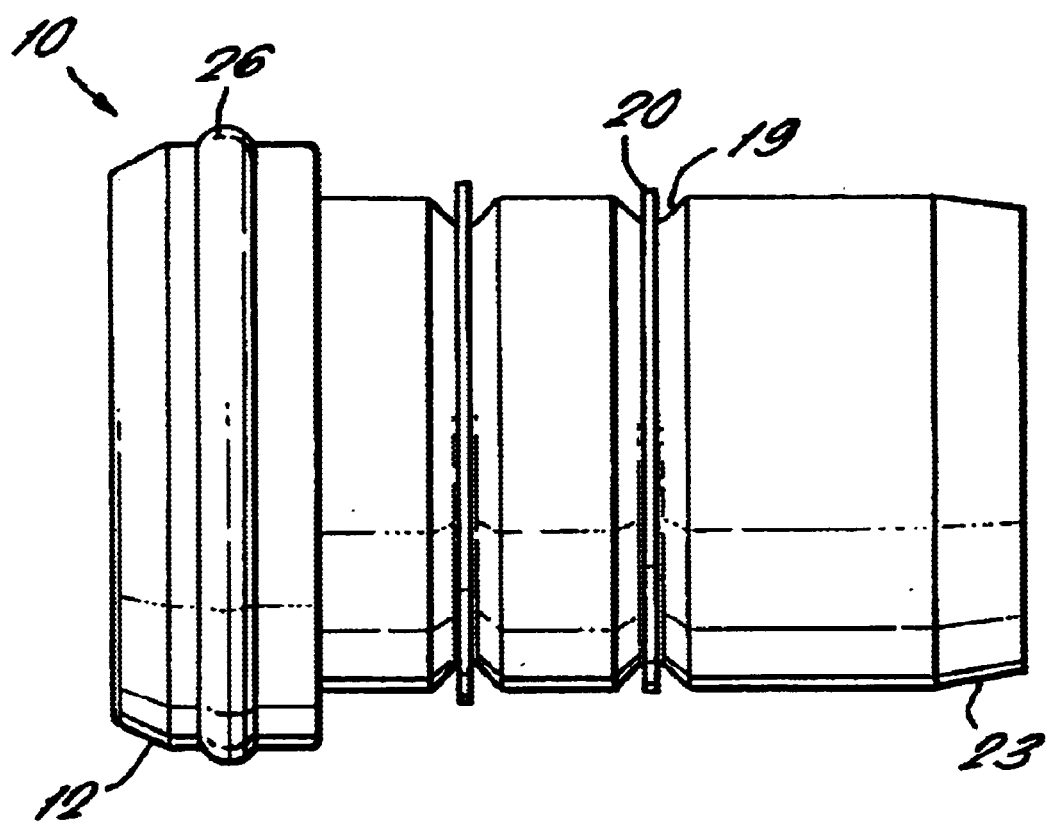

MOLDED PLASTICS TUBULAR COUPLINGS

BACKGROUND TO THE INVENTION

1. Field of the Invention

This invention relates to moulded plastics tubular couplings and is particularly although not exclusively applicable to tube end supports for locating a tube end in a tube coupling.

2. Background Prior Art

My European Patent Publication No. 0756126 discloses a tube coupling comprising a coupling body having a throughway open at one end to receive a tube, the diameter of the throughway increasing towards said open end at a first step to form a first enlarged diameter portion to receive a tube and a second step to form a second enlarged diameter portion to receive a tube locking device to hold a tube in the coupling body. A thin wall sleeve has one end engageable in the throughway and the other engageable in the tube to be located in the coupling body so that, in use, the sleeve extends from the tube past the first step into the throughway. The sleeve has a sealing engagement with the internal diameter of the tube to prevent leakage between the sleeve and tube and the end of the sleeve projecting from the tube has an annular seal with seals with the throughway in the coupling body to prevent leakage between the sleeve and coupling body.

My European Patent Application No. 99308504.2 discloses a tube end support for locating a tube end in a tube coupling, comprising a sleeve to be received in a tube, an encircling end stop adjacent one end of the sleeve to limit entry of the sleeve into the tube, encircling gripper means on the sleeve to grip on the internal diameter of a tube to hold the tube on the sleeve and a separate annular seal supported by the end and projecting radially outwardly thereof to seal with the internal diameter of a tube coupling in which the assembly of the end support and tube are located.

SUMMARY OF THE INVENTION

This invention provides a moulded plastics tubular coupling having a cylindrical surface to engage with a corresponding surface of another component, the surface having an annular recess therein and a flexible annular diaphragm formed in the recess integrally with the coupling and having an outer periphery extending proud of the cylindrical surface to engage and grip the corresponding surface of another component.

In one construction according to the invention the annular recess in the cylindrical surface of the coupling is V-shaped and the flexible diaphragm is formed at the apex of the V to be able to flex towards either side of the v when the coupling is engaged with another component.

In a preferred form of the invention the recess and diaphragm are formed on the outer cylindrical surface of the coupling to engage an inner surface of a component to encircle the coupling.

More specifically, in the case where the coupling is intended to receive an end of a length of tubing, the coupling may have a sleeve portion having said recess and diaphragm formed around the outer surface of the sleeve portion partway along the sleeve; a tapered portion at one end of the sleeve to facilitate insertion of the sleeve into an end of a length of tubing and an end stop at the other end of the sleeve to limit the insertion of the sleeve into the tube.

By way of example the end stop may comprise an annular head formed at said other end of the sleeve projecting outwardly of the sleeve.

In one specific arrangement the head may be formed with means to grip/seal with an encircling component in which the sleeve is engaged For example the head may have an encircling groove in which an O-ring or similar seal is mounted.

In a further arrangement the outer surface of the head may have an annular recess in which a further flexible diaphragm is formed integral with the head and projecting proud of the outer surface of the head to engage and lock the head in the bore of a component in which the coupling is located.

BRIEF DESCRIPTION OF THE DRAWINGS

The following is a description of some specific embodiments of the invention, reference being made to the accompanying drawings in which

FIGS. 3 to 5 are similar views of further constructions.

DESCRIPTION OF THE PREFERRED EMBODIMENTS

Figure 1:
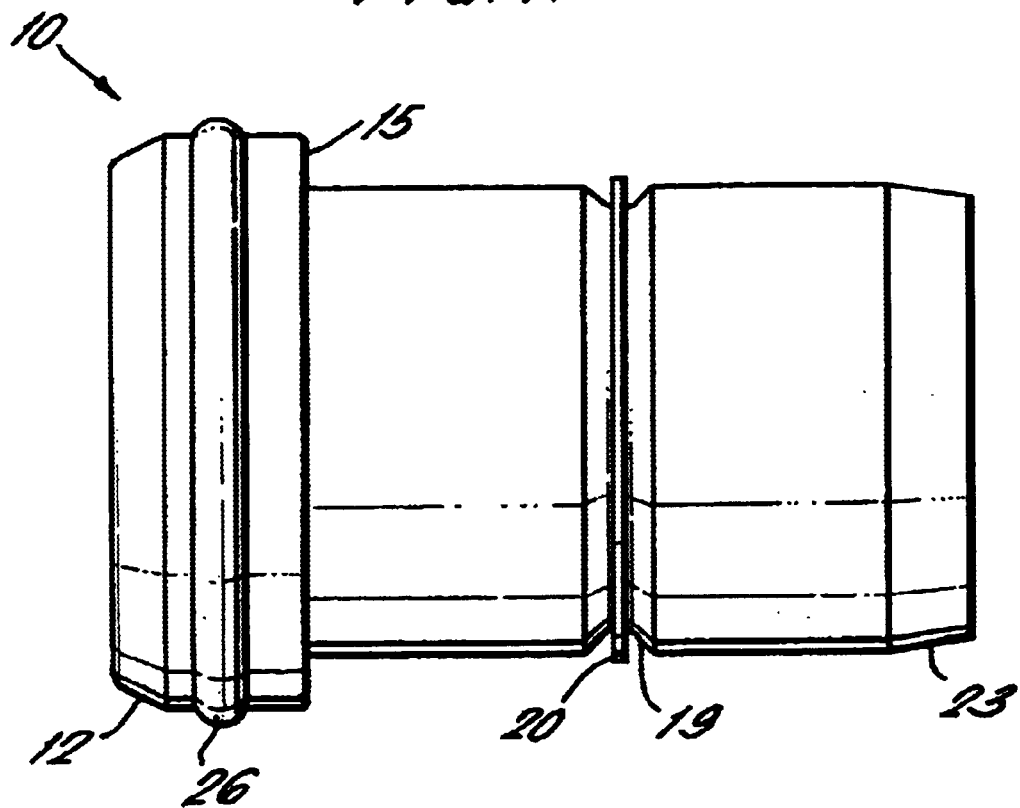
FIG. 1 is an elevation view of a tube end support for locating a tube end in a tube coupling.

Referring firstly to FIG. 1 of the drawings, there is shown a tube end support indicated generally at 10 for locating in an end part of a tube to be inserted in the throughway of a coupling body of a tube coupling, having a locking device such as a collet to engage the tube end and a seal to seal with the tube end. The tube end support comprises a hard moulded plastics sleeve 11 having an annular head 12 at one end thereof The sleeve has an internal bore 13 having a flared entry 14 at the head end of the sleeve.

Figure 2:
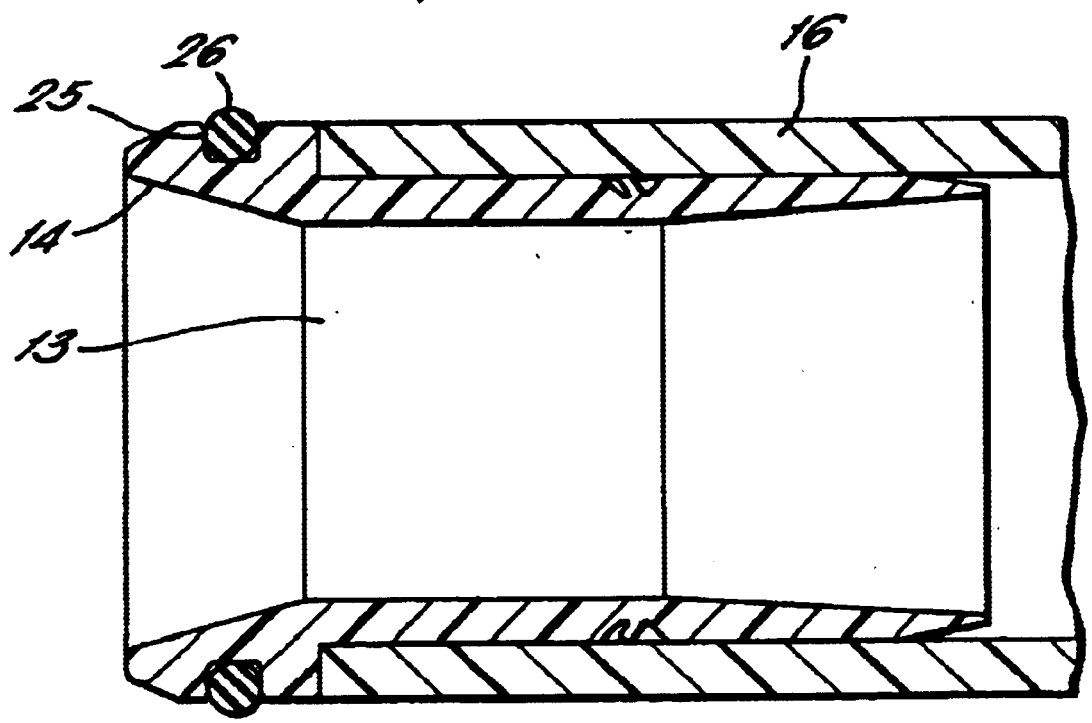
FIG. 2 is a sectional view through the support of FIG. 1.

The head 12 of the sleeve provides a radially annular face 15 directed along the sleeve which forms an end stop to limit insertion of the sleeve 11 into a tube end 16 by engagement with the end of the tube as shown in FIG. 2.

Midway along the sleeve 10 there is an annular V-section groove 19 in the outer surface of the sleeve in which an annular flexible diaphragm 20 is formed integral with the apex of the groove in the sleeve. The outer periphery of the diaphragm projects slightly beyond the outer periphery of the sleeve to engage the inner surface of the tube as the tube is forced over the sleeve to grip and seal with the inner diameter of the tube. The tube is thereby retained on the sleeve with a sealing engagement.

The end of the sleeve 10 remote from the head 15 has a shallow taper as indicated at 23 around its outer periphery to facilitate insertion of the end of the sleeve in the tube. The head 12 has an encircling annular square section groove 25 in which an O-ring or similar form of seal 26 is mounted to seal with the internal bore or throughway in the coupling body in which the tube end is located.

Figure 3:
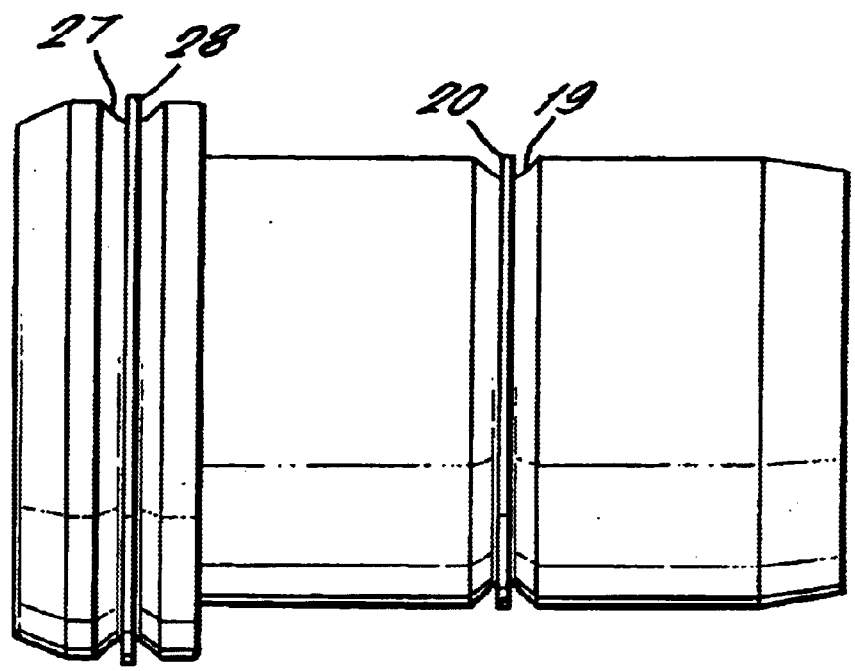
Figure 4:
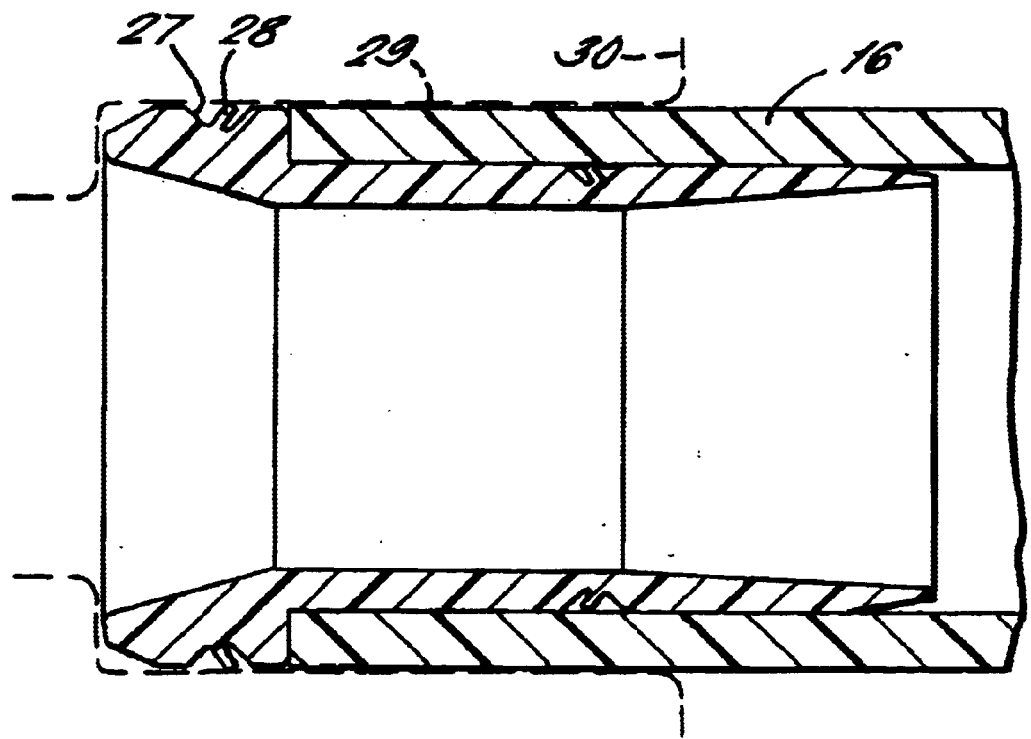

FIGS. 3 and 4 show a modified form of the tube support in which the O-ring seal and groove 25, 26 are omitted and in their place the head has an encircling V-section groove 27 in which a further annular flexible diaphragm 28 formed integrally with the head is formed. Again, the outer periphery of the diaphragm projects slightly proud of the outer surface of the head to engage, grip and seal with an internal bore 29 in a component of the tube coupling body 30 in which the tube end support is located.

FIG. 5 of the drawings shows a further arrangement in which a second annular V-section groove 30 is formed in the outer surface of the sleeve between groove 19 and head 15. The second groove also has an annular flexible diaphragm 31 formed integrally at the apex of the groove and projecting radially from the groove marginally higher than diaphragm 20. Diaphragm 31 serves to grip and retain the sleeve 16 in a bore or hole whereas diaphragm 20 provides a seating function for the sleeve in the bore.

What is claimed is:

1. A hard molded plastic tubular coupling which is intended to receive an end of a length of tubing, said coupling having a sleeve portion, said sleeve portion having an outer cylindrical surface adapted to engage with a corresponding surface of another component, the cylindrical surface having an annular substantially V-shaped recess formed therein partway along said sleeve portion, and a flexible annular diaphragm disposed in the recess integrally with the coupling at the apex of the recess and having an outer periphery extending outwardly from the cylindrical surface to engage and grip the corresponding surface of said another component, said sleeve portion having a tapered portion at one end to facilitate insertion of the sleeve portion into a said end of a length of tubing, and an end stop at the other end of said sleeve portion to limit the extent of insertion of said sleeve portion into said length of tubing.

2. A tubular coupling as claimed in claim 1, wherein the flexible diaphragm is able to flex towards either side of the V when the coupling is engaged with said another component.

3. A coupling as claimed in claim 1, wherein the end stop comprises an annular head at said other end of the sleeve portion, said head projecting outwardly of the sleeve portion.

4. A coupling as claimed in claim 3, wherein the head includes a means to grip and seal with an encircling component in which the sleeve portion is engaged.

5. A coupling as claimed in claim 4, wherein the head has an encircling groove and a sealing ring seated in said groove.

6. A coupling as claimed in claim 4, wherein the outer surface of the head has an annular recess, a further flexible diaphragm is disposed in the annular recess in the head and projecting outwardly from the outer surface of the head to engage and lock the head in the bore of an encircling component in which the coupling is located.

7. A coupling as claimed in claim 1, wherein the coupling has a second encircling annular recess with a second flexible annular diaphragm disposed therein to engage and grip in another component.

8. A coupling as claimed in claim 7, wherein the second recess is V-shaped and the second flexible annular diaphragm is formed in the apex of the V.

9. A coupling as claimed in claim 7, wherein the second diaphragm projects marginally above said flexible annular diaphragm to provide a gripping function, said flexible annular diaphragm providing a sealing function with said another component in which the coupling is engaged.

10. A coupling as claimed in claim 7 and in the case where the coupling has a head at one end, wherein the second annular recess is formed between the V-shaped recess and the head.

* * * * *